L. K. WARD.
CHECK BOOK.
APPLICATION FILED JUNE 5, 1914.

1,184,285.

Patented May 23, 1916.

WITNESSES

R A Balderson
Geo. L. Robinson

INVENTOR
L. K. Ward,
by Bakewell Byrner Parmelee
Attys.

UNITED STATES PATENT OFFICE.

LEE K. WARD, OF WASHINGTON, PENNSYLVANIA.

CHECK-BOOK.

1,184,285. Specification of Letters Patent. Patented May 23, 1916.

Application filed June 5, 1914. Serial No. 843,193.

*To all whom it may concern:*

Be it known that I, LEE K. WARD, a citizen of the United States, residing at Washington, in the county of Washington and State of Pennsylvania, have invented a new and useful Improvement in Check-Books, of which the following is a full, clear, and exact description, reference being had to the accompanying drawing, forming part of this specification, in which the figure is a plan view of a check-book arranged for carrying out my invention, the check-book being open to show the check and the stub therefor.

My invention relates to banking systems, and is designed to provide a new and improved checkbook which will systematize accounts and minimize the labor of individuals or firms in figuring expenditures under different classes or in different directions and of different integral units of money or credit.

As applied to household bank accounts, my system employs a checkbook having on the check, a series of divided off spaces designated in some particular way as by letters or numbers, in addition to the usual matter contained on such checks. The check stubs also have corresponding divisions with corresponding designations, and in the preferred form, the bank deposit slips and the individual ledger page also have in addition to the usual data the same divisions and designations therefor.

In the form shown, the check illustrated at the right-hand has in its right-hand portion a series of divisions marked " O " " F " " H " " C " " E," with a space opposite each designation for an amount to be entered thereunder. These divisions are shown as placed vertically over each other.

On the stub shown at the left-hand end of the figure, there is a corresponding number of divisions, and these are preferably arranged horizontally, so that under each designation the balance is brought forward, the new deposits added; and the totals, the deductions from the check corresponding to this stub and the balances forward may be entered. The stub also contains the usual spaces for data corresponding to the check.

In using this checkbook, the party drawing the check will enter up under each division any amount which he wishes to draw for that class and then enter on the face of the check the added up total of these amounts. Corresponding entries will be made on the stub. The bank will carry several accounts on one ledger page for the same individual, firm or company under the same designations, in this case " O " " F " " H " " C " " E " and the general account will be kept in these separate classes, so that the bank may know to which account to charge each check presented for payment, and the depositor may know what amounts he has spent of the amounts deposited in each class and what amounts remain to his credit in each class. In this way, the depositor will know at the end of any fixed time, such as a year, how much he has deposited and how much he has spent for different classes of expenditures, such, for example, as operating expenses, designated by " O;" food, designated by " F;" clothing, designated by " C," etc., and the system is very desirable, especially in connection with a household budget plan, in which the depositor can estimate in advance what proportion of his income he desires to spend in these different classes.

The advantages of my invention are obvious, since the depositor will have at hand at all times different individual accounts covering different classes of expenditures, showing him how much he has deposited and how much he has drawn in these different classes, and this without the necessity for his keeping books to segregate these items. The ledger books of the bank will simply be kept in a series of columns instead of in a single column.

Changes may be made in the form and arrangement of the check stubs, deposit slips, etc., without departing from my invention.

I claim:

1. A check having a series of divided spaces with different designations therefor, each space being arranged to enter up amounts of money therein to be charged to different accounts, substantially as described.

2. A check book having alternate checks and stubs bound therein, each check, together with its corresponding stub having a series of divisions with corresponding designations applied thereto, said designations indicating different accounts to which the various items set forth on the check are to be charged; substantially as described.

3. A bank check for a plurality of bank accounts, having a series of spaces thereon on which the amounts to be charged to different accounts are set forth, and a space on which the total amount of the check is indicated; substantially as described.

In testimony whereof, I have hereunto set my hand.

LEE K. WARD.

Witnesses:
ERNEST F. HEISER,
CHARLES W. WARD.

Copies of this patent may be obtained for five cents each, by addressing the "Commissioner of Patents, Washington, D. C."